UNITED STATES PATENT OFFICE.

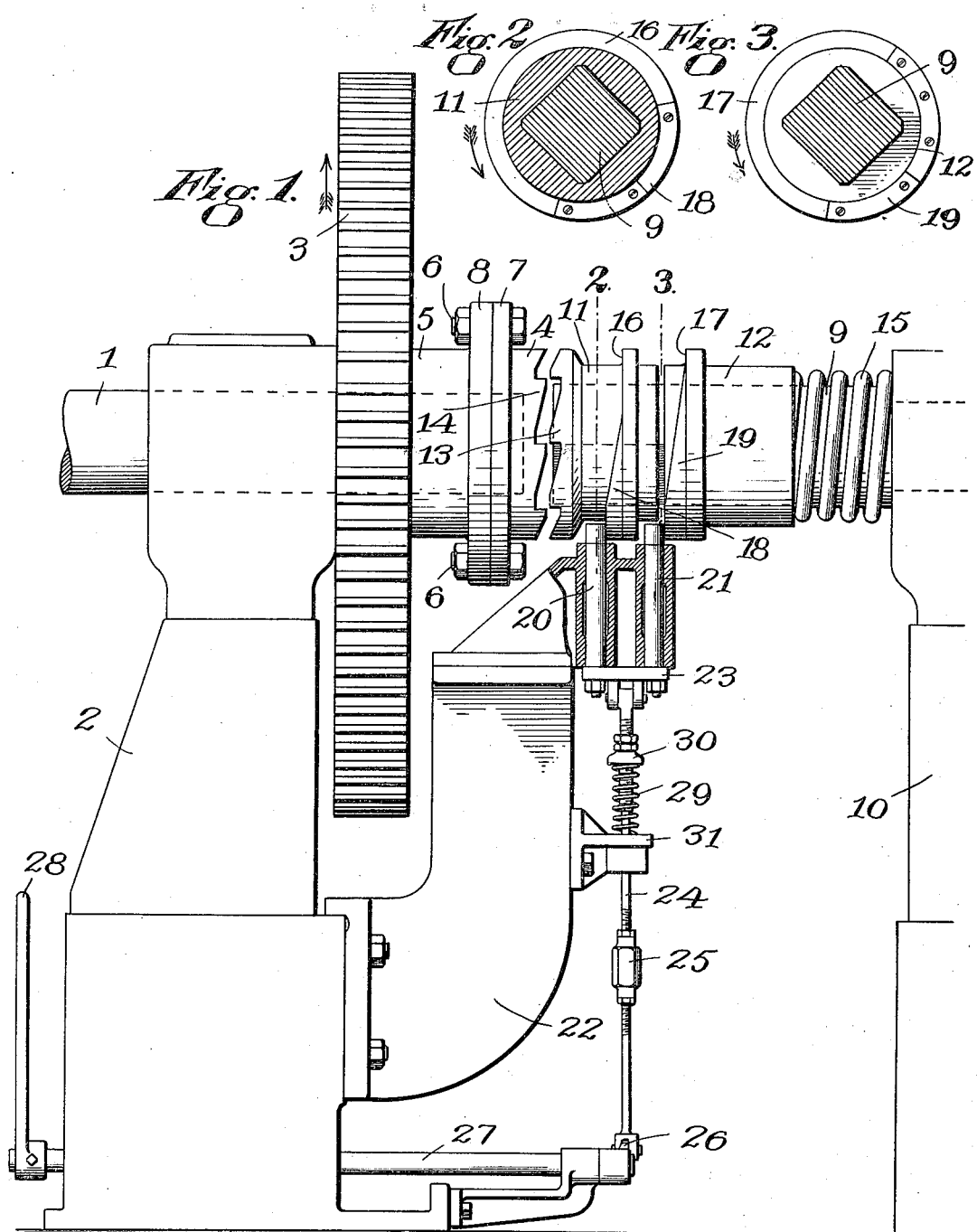

LEON LESLIE FULLER, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CLUTCH.

1,193,008.

Specification of Letters Patent.

Patented Aug. 1, 1916.

Application filed September 19, 1913. Serial No. 790,637.

*To all whom it may concern:*

Be it known that I, LEON LESLIE FULLER, a citizen of the United States, residing at Worcester, in the county of Worcester and Commonwealth of Massachusetts, have invented a new and useful Improvement in Clutches, of which the following, together with the accompanying drawing, is a specification.

My invention relates to clutches and more particularly to that class of clutches in which a yielding member such as a spring is employed to press into engagement those clutch elements adapted to bind the clutch driving mechanism with that mechanism driven by the clutch.

When a clutch of this class is opened by forcing its engaging elements apart against the force of the pressure member, the pressure member tends, of course, to oppose and retard the opening of the clutch so that the separation of the engaging elements of the clutch does not take place as quickly and smoothly as is desirable, there being a tendency toward relative rotation between the driving and driven portions of the clutch before its engaging elements have been entirely separated.

One object of the invention, therefore, is to overcome this objection by providing a clutch so constructed that the pressure applied to the engaging elements of the clutch to hold them in operative engagement may be reduced or removed before the engaging elements are separated, the separation of these engaging elements being thus effected without any undesirable opposition or retardation.

Other objects of the invention will be apparent from the following description taken in connection with the accompanying drawing, in which—

Figure 1 is an elevation of mechanism including a driving and a driven shaft with an interposed clutch constructed in accordance with my invention, a portion of the clutch controlling means being shown in section; Fig 2 is a sectional view on the line 2 of Fig. 1; and Fig. 3 is a sectional view on the line 3 of Fig. 1.

Like reference characters refer to similar parts in the different figures.

In the form of invention shown in the drawing, the driving shaft 1 rotates in a bearing at the top of the support 2 and is driven by the gear wheel 3 which is keyed or otherwise secured to the shaft 1 in any desirable manner, the direction of rotation of the shaft and gear wheel being indicated by arrows in the different figures. A cylindrical engaging member 4 surrounds the outer end of the shaft 1 and is secured to the hub 5 of the gear wheel 3 by bolts 6 passing through the flanges 7 and 8 of the engaging element 4 and the hub 5 respectively.

The driven shaft 9, in alinement with the driving shaft 1 rotates in a bearing at the upper end of the support 10. The driven shaft carries two sleeves 11 and 12 at its end nearest the driving shaft 1, that portion of the driven shaft lying within the sleeves 11 and 12 being square and fitting slidably into corresponding openings in the sleeves so as to prevent rotation of the sleeves relatively to the driven shaft, the sleeves being free, however, to slide longitudinally of the shaft. The adjacent edges of the sleeve 11 and the cylindrical engaging member 4 are provided with coöperating teeth 13 and 14 respectively so that, when the sleeve 11 slides along the driven shaft 9 toward the engaging member 4, the teeth 13 will engage the teeth 14 so as to be driven thereby and so as themselves to drive the driven shaft 9, the sleeve 11 thus constituting a second engaging member of the clutch. The spring 15, surrounding the driven shaft 9 and confined between the sleeve 12 and the upper end of the support 10, tends to slide the sleeve 12 and the engaging member 11 along the driven shaft 9 toward the engaging member 4 and to hold the teeth 13 and 14 in full engagement so as to compel the shaft 9 to rotate with the driving shaft 1.

The engaging member 11 and the sleeve 12 are formed with shoulders 16 and 17 respectively, each of these shoulders facing the other engaging member 4. A cam 18 is secured to the shoulder 16 and a second cam 19 is secured to the shoulder 17. Two pins 20 and 21, supported in guideways at the top of the arm 22, are movable longitudinally to carry their upper ends into and out of the paths of the two cams 18 and 19. The lower ends of the two pins 20 and 21 are joined by a connecting bar 23 to which is pivotally joined the upper end of the rod 24, the rod 24 being adjustable by means of the turnbuckle 25. The lower end of the rod 24 is pivoted to an arm 26 extending laterally from the shaft 27 and a hand lever 28 is provided on the other end of the shaft 27 to permit it to be rotated normally so as to move the pins 20 and 21 simultaneously out of the normal paths of the cams 18 and 19. A spring 29, confined between an adjustable collar 30 on the rod 24 and a fixed support 31 surrounding the rod, serves to hold the pins 20 and 21 in the normal paths of the cams 18 and 19 except when its force is overcome and the pins withdrawn by the hand lever 28.

When the pins 20 and 21 are withdrawn from the normal paths of the cams 18 and 19, the spring 15 will hold the engaging members 4 and 11 together with their teeth 13 and 14 in engagement so that the driven shaft 9 will be compelled to rotate with the driving shaft 1. When it is desired to open the clutch so as to disconnect the driven shaft from the driving shaft, the hand lever 28 is released to allow the spring 29 to force the pins 20 and 21 into the paths of the rotating cams 18 and 19. If the cams happen to be under the pins when they are released, the pins will merely ride along the outer edges of the cams until the cams have passed beyond them, the spring 29 then moving the pins upwardly toward the driven shaft so that they will engage the cam faces of the cams at the next revolution of the shafts. The forward ends of both the cams 18 and 19 are tapered so that, as they rotate into contact with the pins 20 and 21, they will be forced longitudinally of the driven shaft 9 so as to carry the sleeve 12 and the engaging member 11 away from the engaging member 4 sufficiently to open the clutch. The forward end of the cam 19 rotates in advance of the forward end of the cam 18, as indicated in the different figures, so that the sleeve 12 is moved a short distance from the engaging member 11 before the cam 18 strikes the pin 20. The cam 19 is also thicker than the cam 18 at all corresponding points so that, after this cam 19 strikes the pin 21, it will be separated from the engaging member 11 until the clutch is entirely opened and the driven shaft has stopped rotating. The angular positions of the thick trailing extremities of the cams 18 and 19 are the same so that, if the pins 20 and 21 when released strike the outer edges of the cams, both the cams will pass beyond the pins at the same instant.

In a clutch constructed in accordance with my invention, it is clear that the spring or other pressure member is free to exert its full force to hold the engaging members of the clutch in contact while the clutch is in operation. In opening the clutch, however, the force of the pressure member is first removed from the engaging members, thus leaving them free to be separated or opened except for what friction there may be between them, the engaging members thereafter being separated or opened without any undesirable opposition or retardation. Inasmuch as the force of the pressure member is removed from the engaging members before the latter have been separated, a spring of any desired strength may be used. Separation of the engaging members of the clutch under these conditions is effected more completely and smoothly and with less danger of injury to the engaging members than in the case of clutches so constructed that separation of the engaging members can take place only against a considerably opposing force of the pressure member and, consequently, without proper and safe resulting clearance between the engaging members.

While I have shown and described the details of one form of my invention, I do not wish to be limited to such details as changes may be made without departing from the spirit of the invention; but Having described my invention, what I claim as new and desire to secure by Letters Patent is:

1. A clutch including a pair of engaging members, means for pressing the engaging members together, and means, operated by the rotation of one of said members for removing the pressure of said pressing means from the engaging means.

2. The combination, with a pair of rotatable members, of a pair of engaging members carried by said rotatable members, means for pressing said engaging members together, whereby the rotation of one of said rotatable members is imparted to the other, and means, operated by the rotation of one of said rotatable members, for removing the pressure from said engaging members.

3. A clutch including a pair of engaging members, means for pressing the engaging members together, means operated by the rotation of one of said members for removing the pressure of said means from the engaging members, and means for thereafter disengaging the engaging members.

4. A clutch including a pair of engaging members, means for pressing the engaging members together, and means for removing the pressure of said means from the engaging members, by the rotation of one of said members, and for thereafter disengaging the engaging members.

5. In combination with a driving shaft and a driven shaft, a clutch including an engaging member fixed to one of said shafts, a second engaging member slidable longitudinally of the other of said shafts, means for pressing the slidable engaging member into engagement with the fixed engaging member, and means, operated by the rotation of one of said engaging members, for removing the pressure of said pressing means from the slidable engaging member.

6. In combination with a driving shaft and a driven shaft, a clutch including a driving engaging member secured to the driving shaft, a driven engaging member and a sleeve movable longitudinally of the driven shaft, the driven engaging member and the sleeve being provided with cams, a spring to press the sleeve against the driven engaging member to force it into engagement with the driving engaging member, means for engaging the cam on the sleeve to move it away from the driven engaging member, and means for thereafter engaging the cam on the driven engaging member to move it out of engagement with the driving engaging member.

7. In combination with a driving shaft and a driven shaft, a clutch including a driving engaging member secured to the driving shaft, a driven engaging member and a sleeve movable longitudinally of the driven shaft, the driven engaging member and the sleeve being provided with cams, a spring to press the sleeve against the driven engaging member to force it into engagement with the driving engaging member, means for engaging the cam on the sleeve to move it away from the driven engaging member, means for thereafter engaging the cam on the driven engaging member to move it out of engagement with the driving engaging member, and means for operating said cam engaging means simultaneously.

8. In combination with a driving shaft and a driven shaft, a clutch including a driving engaging member secured to the driving shaft, a driven engaging member and a sleeve movable longitudinally of the driven shaft, the driven engaging member and the sleeve being provided with cams, a spring to press the sleeve against the driven engaging member to force it into engagement with the driving engaging member, and means for engaging said cams to move the sleeve and the driven engaging member away from the driving engaging member, the cam on the sleeve being higher than the cam on the driven engaging member to cause the sleeve to be moved ahead of the driven engaging member by said cam engaging means.

Dated this third day of September, 1913.

LEON LESLIE FULLER.

Witnesses:
EDWARD J. QUINN,
ELBERT H. CARROLL.